(12) United States Patent
Huang et al.

(10) Patent No.: US 9,725,620 B2
(45) Date of Patent: Aug. 8, 2017

(54) CERIUM OXIDE BASED COMPOSITE POLISHING POWDER AND PREPARATION METHOD THEREOF

(71) Applicant: GRIREM ADVANCED MATERIALS CO., LTD., Beijing (CN)

(72) Inventors: Xiaowei Huang, Beijing (CN); Ying Yu, Beijing (CN); Zhiqi Long, Beijing (CN); Liangshi Wang, Beijing (CN); Dali Cui, Beijing (CN); Yongke Hou, Beijing (CN); Meisheng Cui, Beijing (CN)

(73) Assignee: GRIREM ADVANCED MATERIALS CO., LTD., Beijing (CN)

( * ) Notice: Subject to any disclaimer, the term of this patent is extended or adjusted under 35 U.S.C. 154(b) by 164 days.

(21) Appl. No.: 14/412,366

(22) PCT Filed: Nov. 7, 2013

(86) PCT No.: PCT/CN2013/086705
§ 371 (c)(1),
(2) Date: Dec. 31, 2014

(87) PCT Pub. No.: WO2014/071859
PCT Pub. Date: May 15, 2014

(65) Prior Publication Data
US 2015/0184027 A1    Jul. 2, 2015

(30) Foreign Application Priority Data

Nov. 7, 2012 (CN) .......................... 2012 1 0441638

(51) Int. Cl.
| | | |
|---|---|---|
| *B24D 3/00* | (2006.01) | |
| *B24D 3/02* | (2006.01) | |
| *B24D 11/00* | (2006.01) | |
| *B24D 18/00* | (2006.01) | |
| *C09K 3/14* | (2006.01) | |
| *C09G 1/02* | (2006.01) | |

(52) U.S. Cl.
CPC ...................................... *C09G 1/02* (2013.01)

(58) Field of Classification Search
USPC .......................................... 51/309, 293, 307
See application file for complete search history.

(56) References Cited

U.S. PATENT DOCUMENTS

| | | |
|---|---|---|
| 7,025,796 B2 | 4/2006 | Komiya et al. |
| 7,431,758 B2 | 10/2008 | Ota et al. |
| 8,808,660 B2 | 8/2014 | Huang et al. |
| 2004/0139764 A1 | 7/2004 | Komiya et al. |
| 2005/0198912 A1* | 9/2005 | Kim ..................... C09K 3/1463 51/307 |
| 2005/0252092 A1* | 11/2005 | Kim ......................... C09G 1/02 51/307 |
| 2008/0307712 A1* | 12/2008 | Schermanz ......... C01F 17/0043 51/309 |
| 2011/0274977 A1* | 11/2011 | Nakura .................. C01G 53/00 429/223 |
| 2011/0280778 A1 | 11/2011 | Huang et al. |

FOREIGN PATENT DOCUMENTS

| | | |
|---|---|---|
| CN | 1810911 A | 8/2006 |
| CN | 1899966 A | 1/2007 |
| CN | 1903962 A | 1/2007 |
| CN | 101284952 A | 10/2008 |
| CN | 101284983 A | 10/2008 |
| CN | 101735768 A | 6/2010 |
| CN | 101798627 A | 8/2010 |
| CN | 102337083 A | 2/2012 |
| CN | 102417352 A | 4/2012 |
| CN | 102559138 A | 7/2012 |
| CN | 102643614 A | 8/2012 |
| CN | 103382369 A | 11/2013 |
| JP | H03146585 A | 6/1991 |
| JP | H07286171 A | 10/1995 |

(Continued)

OTHER PUBLICATIONS

Office Action for Japanese Patent Application No. 2015-518841, received Mar. 29, 2016 (6 pages) (No English language translation provided).

Office Action for Korean Patent Application No. 10-2014-7036361, dated Sep. 28, 2016 (5 pages) (No English language translation provided).

SIPO Search Report for Chinese Patent Application No. 201210441638X, dated Oct. 11, 2016 (1 page) (No English language translation provided).

(Continued)

*Primary Examiner* — James McDonough
(74) *Attorney, Agent, or Firm* — Clark & Elbing LLP

(57) ABSTRACT

The present invention provides a cerium oxide based composite polishing powder and a preparation method thereof. The polishing powder contains the element magnesium in an amount of 0.005 wt %-5 wt % to magnesium oxide meter. The preparation method includes: (1) uniformly mixing a salt solution containing cerium serving as the main component of the polishing powder; (2) uniformly mixing a precipitating agent of an aqueous magnesium bicarbonate solution with the mixed solution prepared in step (1) to obtain a slurry; (3) aging the slurry prepared in step (2) for 0-48 h while the temperature of the slurry is kept at 30-90 degrees centigrade, and filtering the aged slurry to obtain the precursor powder of the polishing powder; (4) calcinating the precursor powder at 600-1000 degrees centigrade, then dispersing and separating the calcinated precursor powder to obtain the polishing powder. The present invention improves the polishing performance and the suspension performance of polishing powder.

6 Claims, No Drawings

(56) References Cited

FOREIGN PATENT DOCUMENTS

| JP | H11269455 A | 10/1999 |
| JP | 2002-155269 A | 5/2002 |
| JP | 2004-219391 A | 8/2004 |
| JP | 4585991 B2 | 11/2010 |

OTHER PUBLICATIONS

SIPO Supplementary Search Report for Chinese Patent Application No. 201210441638X, dated Oct. 11, 2016 (1 page) (No English language translation provided).
International Search Report for International Patent Application No. PCT/CN2013/086705, mailed Feb. 20, 2014 (2 pages).

* cited by examiner

CERIUM OXIDE BASED COMPOSITE POLISHING POWDER AND PREPARATION METHOD THEREOF

TECHNICAL FIELD

The present invention relates to a cerium oxide based composite polishing powder and a preparation method thereof, belonging to the field of rare earth materials.

BACKGROUND

Rare earth polishing powder rich in cerium oxide has taken the place of iron oxide as a key technical material used in glass polishing process since the 1940s. Compared with the conventional polishing powder, rare earth polishing powder has advantages of high polishing speed, high degree of finish and long service life; moreover, rare earth polishing powder is capable of improving polishing quality and operation environment. For its unique chemical mechanical functional mechanism which brings a high polishing efficiency, rare earth polishing powder has become the first choice when it comes to selecting a glass polishing material and has been widely used to polish products including eyeglass, optical elements (lens, prism), the glass shell of color TV, electronic glass for panel display, silicon wafer and the glass substrate of magnetic disk.

When used as polishing abrasive particles, the usability of cerium oxide ($CeO_2$ is related to not only its chemical composition and purity but also its crystal type, morphology, particle size distribution, particle size and other indexes, which gives rise to a higher requirement on the control over the preparation of $CeO_2$, thus, it is especially important to develop a $CeO_2$ abrasive material which is highly spherized in appearance and has a uniform particle size distribution and a high polishing capability. Although quite a few $CeO_2$ preparation technologies have been reported already, the prepared $CeO_2$ by these technologies commonly suffer disadvantages including severe particle aggregation, non-uniform particle size distribution and unstable performance which make its usability undermined.

What is most hazardous to a polishing process are superhard particles which may cause a mechanical damage, and then superhard particles will lead to the generation of scratches on a polished surface to increase the degree of imperfection and roughness on the surface of the polished workpiece; even softly aggregated particles will also influent on the quality of the surface of the polished workpiece.

SUMMARY

It is an object of the present invention to provide a cerium oxide based composite polishing powder which has an excellent polishing performance and which, when used for a polishing processing, makes the particles in a polishing liquid distributed uniformly to eliminate the aggregation of particles.

It is another object of the present invention to provide a method for preparing the cerium oxide based composite polishing powder.

In accordance with an aspect of the present invention, a cerium oxide based composite polishing powder is provided which comprises the element of magnesium in an amount of 0.005-5 wt % to magnesium oxide meter.

Further, the content of the element of magnesium is 0.01-2 wt % to magnesium oxide meter.

Further, the cerium oxide based composite polishing powder comprises at least one of the other rare earth elements different from cerium.

Further, the cerium oxide based composite polishing powder comprises 0.2-8% by weight of the element of fluorine.

Further, the cerium oxide based composite polishing powder comprises 0.1-5% by weight of the element of phosphorus.

Further, the content of cerium oxide is 40-99.99 wt %.

Further, the median particle diameter $D_{50}$ of the cerium oxide based polishing powder is 0.02-5 μm, and preferably 0.5-3 μm.

In accordance with another aspect of the present invention, a cerium oxide based composite polishing powder is provided which comprises cerium oxide, the element of magnesium and one or more of the other rare earth elements different from cerium, wherein the content of cerium oxide is 40-99.99 wt %, the content of the element of magnesium is 0.005-5 wt % to magnesium oxide meter, and the content of the one or more other rare earth elements different from cerium is 0-59.995 wt %.

Further, the content of the element magnesium is 0.01-2 wt % to magnesium oxide meter.

Further, the cerium oxide based composite polishing powder comprises 0.2-8% by weight of the element of fluorine.

Further, the cerium oxide based composite polishing powder comprises 0.1-5% by weight of the element of phosphorus.

Further, the median particle diameter $D_{50}$ of the cerium oxide based polishing powder is 0.02-5 μm, and preferably 0.5-3 μm.

In accordance with another aspect of the present invention, a method for preparing the cerium oxide based composite polishing powder described above is provided which includes the following steps: (1) uniformly mixing a salt solution containing cerium serving as the main component of the polishing powder; (2) uniformly mixing a precipitating agent of an aqueous magnesium bicarbonate solution with the mixed solution prepared in step (1) to obtain a slurry; (3) aging the slurry prepared in step (2) for 0-48 h while the temperature of the slurry is kept at 30-90 degrees centigrade, and filtering the aged slurry to obtain the precursor powder of the polishing powder; and (4) calcinating the precursor powder at 600-1000 degrees centigrade, then dispersing and separating the calcinated precursor powder to obtain the cerium oxide based composite polishing powder.

Further, the salt solution is nitrate solution, sulfate solution or chloride solution in step (1).

Further, in step (2), the concentration of the aqueous magnesium bicarbonate solution is 5-25 g/L to magnesium oxide meter.

Further, the amount of the precipitating agent used in step (2) is 100-130% of a theoretical amount, the precipitation temperature is 15-30 degrees centigrade, and the stirring operation lasts for 0.5-5 h.

Further, a surfactant of polyethylene glycol or ethylene glycol is added into and uniformly mixed with the mixed solution during the precipitation process in step (2), wherein the amount of the added surfactant is 0.1-5.0% of the theoretical weight of the polishing powder.

Further, a fluorine or phosphorus-containing compound is added in step (2) or (3), wherein the phosphorus-containing compound is phosphoric acid or phosphate, and the fluorine-containing compound is at least one of ammonium fluoride, hydrofluoric acid, sodium fluosilicate and sodium fluoride.

Further, the $CO_2$ generated during the precipitation process and the calcination process is collected and recycled to prepare an aqueous magnesium bicarbonate solution.

In accordance with another aspect of the present invention, a method for preparing the cerium oxide based composite polishing powder described above is provided which includes the following steps: (1) uniformly mixing a salt solution containing cerium serving as the main component of the polishing powder to obtain a mixed solution; (2) adding an aqueous magnesium bicarbonate solution into basal water of an aqueous solution containing fluorinions and/or phosphate anions in an amount of 50-100% of a theoretical amount needed by the aqueous magnesium bicarbonate solution to react with fluorine and/or phosphorus, then synchronously adding the mixed solution prepared in step (1) and the aqueous magnesium bicarbonate solution into basal water in the form of parallel flows to obtain a slurry; (3) aging the slurry prepared in step (2) for 0-48 h while the temperature of the slurry is kept at 30-90 degrees centigrade, filtering and washing the aged slurry to obtain the precursor of the polishing powder; and (4) calcinating the precursor at 600-1000 degrees centigrade, then dispersing and separating the calcinated precursor powder to obtain the cerium oxide based composite polishing powder.

Further, in step (1), the salt solution is nitrate solution, sulfate solution or chloride solution, and the rare earth concentration of the salt solution is 10-300 g/L to REO meter.

Further, the concentration of the aqueous magnesium bicarbonate solution is 5-25 g/L to magnesium oxide meter in step (2).

Further, in step (2), the total amount of the aqueous magnesium bicarbonate solution used is 100-130% of a theoretical amount, the pH value of the slurry is 5-8, the precipitation temperature is 15-50 degrees centigrade, and the stirring operation lasts for 0.5-5 h.

Further, in step (2), a surfactant polyethylene glycol or ethylene glycol is added into and uniformly mixed with the mixed solution during the precipitation process, wherein the amount of the added surfactant is 0.1-5.0% of the theoretical weight of the polishing powder.

Further, in step (2), the aqueous solution containing phosphate anions is at least one of aqueous solutions of phosphoric acid, sodium phosphate, dibasic sodium phosphate, ammonium phosphate and ammonium hydrogen phosphate, and the aqueous solution containing fluorinions is at least one of aqueous solutions of ammonium fluoride, hydrofluoric acid, sodium fluosilicate and sodium fluoride.

Further, the $CO_2$ generated in steps (2) and (4) is collected and recycled to prepare an aqueous magnesium bicarbonate solution.

By adding a tiny amount of the element magnesium into a cerium oxide based composite polishing powder, the present invention greatly improves the polishing performance and the suspension performance of the polishing powder, and avoids the agglomeration of particles caused by the non-uniform distribution of the particles in a polishing slurry.

As an aqueous magnesium bicarbonate solution is used as a precipitating agent in the preparation of the precursor (cerium carbonate) of the cerium oxide based composite polishing powder, little magnesium fluoride and/or little phosphates of magnesium are/is generated firstly during the precipitation process, which is beneficial for improving the crystallinity of the polishing powder, facilitating the spheroidization of the polishing powder and narrowing the particle size distribution of the polishing powder, as a result, the dispersibility and the suspension performance of the slurry of the polishing powder are improved, thus increasing the material removal rate of the polishing powder and decreasing the scratches generated during a polishing process.

A new cerium oxide based rare earth polishing powder material different from the conventional products can be prepared from the foregoing preparation process which further comprises at least one of the elements of fluorine and phosphorus in addition to the element of magnesium. The excellent synergistic effect generated from the combination of the element of fluorine and/or the element of phosphorus contained in the cerium based polishing powder with the element of magnesium further increases the material removal rate of the polishing powder, facilitates the spheroidization of the polishing powder, improves the dispersibility of the polishing powder and reduces the particle size of the polishing powder, thus improving the suspension performance and the uniformity of a slurry for preparing the polishing powder, decreasing the scratches generated during a polishing process and improving the comprehensive usability of the polishing powder.

For the use of an aqueous magnesium bicarbonate solution as a precipitating agent in the preparation of the cerium oxide based polishing powder, the cerium oxide based polishing powder is characterized in being environment friendly and generating no emission of ammonia or nitrogen, moreover, the $CO_2$ generated during the precipitation process and the calcination process are recycled, achieving a purpose of low carbon emission.

DETAILED DESCRIPTION OF THE EMBODIMENTS

It should be noted that the embodiments of the present invention and the features thereof can be combined with each other without causing any conflicts. The present invention is described below in detail with reference to embodiments.

In accordance with a typical embodiment of the present invention, a cerium oxide based composite polishing powder is provided which comprises the element magnesium in an amount of 0.005-5 wt % to magnesium oxide meter. A method for preparing the cerium oxide based composite polishing powder includes: (1) uniformly mixing a salt solution containing cerium serving as the main component of the polishing powder; (2) uniformly mixing a precipitating agent of an aqueous magnesium bicarbonate solution with the mixed solution prepared in step (1) to obtain a slurry; (3) aging the slurry prepared in step (2) for 0-48 h while the temperature of the slurry is kept at 30-90 degrees centigrade, and filtering and washing the aged slurry to obtain the precursor powder of the polishing powder; and (4) calcinating the precursor powder at 600-1000 degrees centigrade, then dispersing and separating the calcinated precursor powder to obtain the cerium oxide based composite polishing powder.

As a tiny amount of the element of magnesium is added in the cerium oxide based composite polishing powder, the existence of magnesium leads to the more negative potential of Zata in the slurry of the polishing powder to weaken the aggregation performance of the slurry of the polishing powder and eliminates overhard particles; moreover, bivalent magnesium makes it easier for tetravalent cerium polishing powder to be physically absorbed with a workpiece, which effectively improves the polishing effect of the polishing powder as the performance of the polishing powder depends strongly upon the absorption of the polishing powder with the polished workpiece; besides, as cerium ions are partly replaced by magnesium ions, so the crystal lattice of the polishing powder is distorted to enhance the chemical activity of the polishing powder; the doping of magnesium facilitates the spheroidization of the surface of the polishing powder to improve the polishing performance of the polishing powder, also the addition of the element magnesium improves the suspension performance of the polishing powder and avoids the agglomeration of particles caused by the non-uniform distribution of the particles in the polishing slurry.

Excessive magnesium bicarbonate is added during the reaction process and then thermally decomposed into magnesium carbonate precipitate, so that magnesium carbonate is uniformly distributed in cerium carbonate precipitate, then the obtained product is calcinated to obtain a cerium oxide based composite polishing powder containing a certain amount of magnesium oxide.

The cerium oxide content of the composite polishing powder can be changed within a range of 40-99.99 wt % to be applicable to different polished objects.

The median particle diameter $D_{50}$ of the cerium oxide based composite polishing powder is 0.02-5 µm, and preferably 0.5-3 µm.

In step (1), the salt solution is nitrate solution, hydrochloride solution or sulfate solution.

In step (2), the concentration of the aqueous magnesium bicarbonate solution is 5-25 g/L to magnesium oxide meter.

In step (2), the amount of the precipitating agent used is 100-130% of a theoretical amount, the precipitation temperature is 15-30 degrees centigrade, and the stirring operation lasts for 0.5-5 h.

Further, a surfactant of polyethylene glycol or ethylene glycol is added into and uniformly mixed with the mixed solution during the precipitation process in step (2), wherein the amount of the added surfactant is 0.1-5.0% of the theoretical weight of the polishing powder.

In step (2), the aqueous solution containing phosphate anions is phosphoric acid or phosphate, and the aqueous solution containing fluorinions is at least one of ammonium fluoride, hydrofluoric acid, sodium fluosilicate and sodium fluoride.

In accordance with a typical embodiment of the present invention, a cerium oxide based composite polishing powder is provided which comprises cerium oxide, the element of magnesium and one or more of the other rare earth elements different from cerium, wherein the content of cerium oxide is 40-99.99 wt %, the content of the element of magnesium is 0.005-5 wt % to magnesium oxide meter, and the content of the one or more other rare earth elements different from cerium is 0-59.995 wt %. A method for preparing the cerium oxide based composite polishing powder is provided which includes the following steps: (1) uniformly mixing a salt solution containing cerium serving as the main component of the polishing powder to obtain a mixed solution; (2) adding an aqueous magnesium bicarbonate solution into basal water of an aqueous solution containing fluorinions and/or phosphate anions in an amount of 50-100% of a theoretical amount needed by the aqueous magnesium bicarbonate solution to react with fluorine and/or phosphorus, then synchronously adding the mixed solution prepared in step (1) and the aqueous magnesium bicarbonate solution into basal water in the form of parallel flows to obtain a slurry; (3) aging the slurry prepared in step (2) for 0-48 h while the temperature of the slurry is kept at 30-90 degrees centigrade, filtering and washing the aged slurry to obtain the precursor of the polishing powder; and (4) calcinating the precursor at 600-1000 degrees centigrade, then dispersing and separating the calcinated precursor powder to obtain the cerium oxide based composite polishing powder.

As a tiny amount of the element of magnesium is added in the cerium oxide based composite polishing powder, the existence of magnesium leads to the more negative potential of Zata in the slurry of the polishing powder to weaken the aggregation performance of the slurry of the polishing powder and eliminates overhard particles; moreover, bivalent magnesium makes it easier for tetravalent cerium polishing powder to be physically absorbed with a workpiece, which effectively improves the polishing effect of the polishing powder as the performance of the polishing powder depends strongly upon the absorption of the polishing powder with the polished workpiece; besides, as cerium ions are partly replaced by magnesium ions, so the crystal lattice of the polishing powder is distorted to enhance the chemical activity of the polishing powder; the doping of magnesium facilitates the spheroidization of the surface of the polishing powder to improve the polishing performance of the polishing powder, also the addition of the element magnesium improves the suspension performance of the polishing powder and avoids the agglomeration of particles caused by the non-uniform distribution of the particles in the polishing slurry. The median particle diameter $D_{50}$ of the cerium oxide based composite polishing powder is 0.02-5 µm, and preferably 0.5-3 µm; and the particle size distribution of the composite polishing powder is equal to or smaller than 1, that is, $(D90-D10)/2\ D_{50} \leq 1$, this narrow particle size distribution is beneficial to decreasing the scratches generated during a polishing process.

Further, as an aqueous magnesium bicarbonate solution is used in the method as a precipitating agent in the preparation of the precursor (cerium carbonate) of the cerium oxide based composite polishing powder, little magnesium fluoride and/or phosphates of magnesium are/is generated firstly during the precipitation process, which is beneficial to improving the crystallinity of the polishing powder, facilitating the spheroidization of the polishing powder and narrowing the particle size distribution of the polishing powder, as a result, the dispersibility and the suspension performance of the polishing powder slurry are improved, which consequentially increases the material removal rate of the polishing powder and decreases the scratches generated during a polishing process.

Excessive magnesium bicarbonate is added during the reaction process and then thermally decomposed into magnesium carbonate precipitate, so that magnesium carbonate is uniformly distributed in cerium carbonate precipitate, then the obtained product is calcinated to obtain a cerium oxide based composite polishing powder containing a certain amount of magnesium oxide.

Preferably, in step (1), the salt solution is nitrate solution, sulfate solution or chloride solution, and the rare earth concentration of the salt solution is 10-300 g/L to REO meter.

Preferably, in step (2), the concentration of the aqueous magnesium bicarbonate solution is 5-25 g/L to magnesium oxide meter.

Preferably, in step (2), the amount of the precipitating agent used is 100-130% of a theoretical amount; the pH value of the slurry is 5-8, the precipitation temperature is 15-50 degrees centigrade, and the stirring operation lasts for 0.5-5 h. The pH value may be controlled at about 5-8 when cerium or zirconium is precipitated using magnesium bicarbonate.

Further, a surfactant of polyethylene glycol or ethylene glycol is added into and uniformly mixed with the mixed solution during the precipitation process of step (2), wherein the amount of the added surfactant is 0.1-5.0% of the theoretical weight of the polishing powder.

Further, in step (2), the aqueous solution containing phosphate anions is at least one of aqueous solutions of phosphoric acid, sodium phosphate, dibasic sodium phosphate, ammonium phosphate and ammonium hydrogen phosphate, and preferably ammonium phosphate and/or dibasic sodium phosphate which can react with magnesium ions to generate stable magnesium ammonium phosphate precipitate; and the aqueous solution containing fluorinions is at least one of aqueous solutions of ammonium fluoride, hydrofluoric acid, sodium fluosilicate and sodium fluoride.

Further, the $CO_2$ generated in steps (2) and (4) is collected and recycled to prepare an aqueous magnesium bicarbonate solution.

The present invention is described below with reference to embodiments.

Embodiment 1

(1) a lanthanum-cerium chloride mixed solution and an aqueous magnesium bicarbonate solution are synchronously added into a reactor at a constant speed, and a little amount of ammonium fluoride is added into the reactor, wherein the amount of the added magnesium bicarbonate is 110% of a theoretical amount, the mixture reacts at 25 degrees centigrade and is then stirred for 3 h to be uniformly mixed, then a slurry is obtained.

(2) the slurry prepared in step (1) is aged for 12 h while the temperature of the slurry is kept at 60 degrees centigrade, then the aged slurry is filtered, washed and dried to obtain the precursor powder of the polishing powder.

(3) the precursor powder is calcinated for 4 hours at 900 degrees centigrade, then the calcinated powder is dispersed and separated to obtain a cerium oxide based composite polishing powder product containing 63.3 wt % of cerium oxide, 0.01 wt % of magnesium oxide and 2.2 wt % of fluorine, wherein the $D_{50}$ of the polishing powder is 2.6 μm.

The obtained cerium oxide based composite polishing powder is prepared into a slurry, then a polishing test is conducted on the application of the slurry to a plate glass sample, the material removal rate resulting from the test is up to 0.48 mg/min, and the finish of the plate glass sample is superior to that of like commercial products.

Comparative Embodiment 1 (Prepared Using an Ordinary Technology)

(1) a lanthanum-cerium chloride mixed solution and an aqueous ammonium bicarbonate solution are synchronously added into a reactor at a constant speed, a little amount of ammonium fluoride is added into the reactor, wherein the amount of the ammonium bicarbonate added is 110% of a theoretical amount, the mixture reacts at 25 degrees centigrade and is then stirred for 3 h to be uniformly mixed, then a slurry is obtained.

(2) the slurry prepared in step (1) is aged for 12 h while the temperature of the slurry is kept at 60 degrees centigrade, then the aged slurry is filtered, washed and dried to obtain the precursor powder of the polishing powder.

(3) the precursor powder is calcinated for 4 hours at 900 degrees centigrade, then the calcinated powder is dispersed and separated to obtain a cerium oxide based polishing powder product containing 63.5 wt % of cerium oxide, 0% of magnesium oxide, and 2.2 wt % of fluorine, wherein the $D_{50}$ of the polishing powder is 3.5 μm.

The obtained cerium oxide based polishing powder is prepared into a slurry, then a polishing test is conducted on the application of the slurry to a plate glass sample, the material removal rate resulting from the test is up to 0.43 mg/min, and the finish of the plate glass sample is close to that of like commercial products.

Embodiment 2

(1) cerium chloride and lanthanum chloride are prepared into a mixture solution in a certain proportion, wherein the rare earth content of the mixture solution is 120 g/L to REO meter.

(2) an aqueous magnesium bicarbonate solution the concentration of which is 15 g/L to magnesium oxide meter is added, as a precipitating agent, into the mixture solution prepared in step (1) at a constant speed to precipitate the mixture solution, wherein the amount of the added magnesium bicarbonate is 105% of a theoretical amount, the mixture reacts at 20 degrees centigrade, the obtained solution is stirred for 0.5 h to obtain a slurry, and polyethylene glycol is added into the slurry in an amount which is 2% of the theoretical weight of the polishing powder and uniformly mixed with the slurry.

(3) the mixture slurry prepared in step (2) is heated to 50 degrees centigrade and aged for 24 h while the temperature is kept, and the aged mixture slurry is filtered, washed and dried to obtain the precursor powder of the polishing powder.

(4) the precursor powder is calcinated for 3 hours at 1000 degrees centigrade, then the calcinated powder is dispersed and separated to obtain a cerium oxide based composite polishing powder product containing 62 wt % of cerium oxide and 0.005 wt % of magnesium oxide, wherein the $D_{50}$ of the polishing powder is 4.8 μm.

Embodiment 3

(1) cerium chloride and lanthanum chloride are prepared into a mixture solution in a certain proportion, wherein the rare earth content of the mixture solution is 150 g/L to REO meter.

(2) an aqueous magnesium bicarbonate solution the concentration of which is 5 g/L to magnesium oxide meter is added, as a precipitating agent, into the mixture solution prepared in step (1) at a constant speed to precipitate the mixture solution, wherein the amount of the added magnesium bicarbonate is 105% of a theoretical amount, the mixture reacts at 20 degrees centigrade, the obtained solution is stirred for 3 h to obtain a slurry, and polyethylene glycol is added into the slurry in an amount which is 5% of the theoretical weight of the polishing powder and uniformly mixed with the slurry, and the uniformly mixed mixture is filtered, washed and dried to obtain the precursor powder of the polishing powder.

(3) the precursor powder is calcinated for 4 hours at 950 degrees centigrade, then the calcinated powder is dispersed and separated to obtain a cerium oxide based composite polishing powder product containing 62 wt % of cerium oxide and 0.05 wt % of magnesium oxide, wherein the $D_{50}$ of the polishing powder is 2.5 μm.

Embodiment 4

(1) an aqueous magnesium bicarbonate solution (concentration: 20 g/L to magnesium oxide meter) and a cerium-lanthanum chloride mixed solution (concentration: 100 g/L to REO meter) are continuously added in a reaction kettle at a constant speed, wherein the amount of the added magnesium bicarbonate is 115% of a theoretical amount, the mixture reacts at 25 degrees centigrade, the obtained product is kept in the reaction kettle for 10 minutes, fed into an aging tank and aged in the aging tank for 2 h at 70 degrees centigrade, then the aged product is filtered, washed and dried to obtain the precursor powder of the polishing powder.

(2) the precursor powder is calcinated for 8 hours at 700 degrees centigrade, then the calcinated powder is dispersed and separated to obtain a cerium oxide based composite polishing powder product containing 60 wt % of cerium oxide and 0.5 wt % of magnesium oxide, wherein the $D_{50}$ of the polishing powder is 1.2 μm.

Embodiment 5

(1) the mixture solution of an aqueous magnesium bicarbonate solution (concentration: 15 g/L to magnesium oxide meter) and cerium chloride (concentration: 100 g/L to REO meter) are continuously added in a reaction kettle at a constant speed, wherein the amount of the added magnesium bicarbonate is 102% of a theoretical amount, the mixture reacts at 35 degrees centigrade and sequentially kept in the reaction kettle for 10 minutes, fed into an aging tank and aged in the aging tank for 5 h at 60 degrees centigrade, then the obtained product is filtered, washed and dried to obtain the precursor powder of the polishing powder.

(2) the precursor powder is calcinated for 6 hours at 850 degrees centigrade, then the calcinated powder is dispersed and separated to obtain a cerium oxide based composite polishing powder product containing 99.99 wt % of cerium oxide and. 0.005 wt % of magnesium oxide, wherein the $D_{50}$ of the polishing powder is 2.3 μm.

Embodiment 6

(1) a lanthanum-cerium-praseodymium-neodymium chloride mixed solution and an aqueous magnesium bicarbonate solution are synchronously added into a reactor at a constant speed while a little amount of hydrogen fluoride is also added into the reactor, wherein the amount of the magnesium bicarbonate added is 130% of a theoretical amount, and the mixture reacts at 15 degrees centigrade and is then stirred for 2 h to obtain a slurry.

(2) the slurry prepared in step (1) is aged for 48 h while the temperature of the slurry is maintained at 30 degrees centigrade, then the aged slurry is filtered and dried to obtain the precursor powder of the polishing powder.

(3) the precursor powder is calcinated for 6 hours at 950 degrees centigrade, then the calcinated powder is dispersed and separated to obtain a cerium oxide based composite polishing powder product containing 40.5 wt % of cerium oxide, 4.8 wt % of magnesium oxide and 0.2 wt % of fluorine, wherein the $D_{50}$ of the polishing powder is 3.8 μm.

Embodiment 7

(1) a cerium chloride solution and an aqueous magnesium bicarbonate solution are synchronously added into a reactor at a constant speed, the mixture reacts at 55 degrees centigrade and is then stirred for 2 hours, and sodium fluoride is added in and uniformly mixed with the obtained product to obtain a slurry.

(2) the slurry is aged for 5 h while the temperature of the slurry is kept at 60 degrees centigrade, then the aged slurry is filtered and dried to obtain the precursor powder of the polishing powder.

(3) the precursor powder is calcinated for 4 hours at 800 degrees centigrade, then the calcinated powder is dispersed and separated to obtain a cerium oxide based composite polishing powder product containing 96.7 wt % of cerium oxide, 1 wt % of praseodymium oxide, 1 wt % of magnesium oxide and 1.2 wt % of fluorine, wherein the $D_{50}$ of the polishing powder is 3.3 μm.

Embodiment 8

(1) magnesium bicarbonate is prepared as a precipitating agent, wherein the amount of the magnesium bicarbonate used in 110% of a theoretical amount, and a cerium sulfate solution is added into and react with the precipitating agent to generate a slurry.

(2) the slurry prepared in step (1) is aged for 2 h while the temperature of the slurry is kept at 90 degrees centigrade, then the aged slurry is filtered, washed and dried to obtain the precursor powder of the polishing powder.

(3) the precursor powder is calcinated for 10 hours at 600 degrees centigrade, then the calcinated powder is dispersed and separated to obtain a cerium oxide based composite polishing powder product containing 99.9 wt % of cerium oxide and 1.15 wt % of magnesium oxide, wherein the $D_{50}$ of the polishing powder is 1.2 μm.

Embodiment 9

(1) cerium nitrate and lanthanum nitrate are prepared into a mixture solution in a certain proportion (200 g/L to REO meter).

(2) an aqueous magnesium bicarbonate solution (12 g/L to magnesium oxide meter) reacts, as a precipitating agent, with the mixture solution prepared in step (1) in a coprecipitation manner to obtain a slurry, wherein the amount of the aqueous magnesium bicarbonate solution is 115% of a theoretical amount, and a surfactant ethylene glycol is added into the slurry in an amount of 3.1% of the theoretical weight of the polishing powder and uniformly mixed with the slurry.

(3) the mixture slurry prepared in step (2) is aged for 5 h while the temperature of the mixture slurry is kept at 80 degrees centigrade, ammonium fluoride is added into and uniformly mixed with the slurry, and the uniformly mixed mixture is filtered and dried to obtain the precursor powder of the polishing powder.

(4) the precursor powder is calcinated for 4 hours at 750 degrees centigrade, then the calcinated powder is dispersed and separated to obtain a cerium oxide based composite polishing powder product containing 70 wt % of cerium oxide, 1.5 wt % of magnesium oxide and 6.8 wt % of fluorine, wherein the $D_{50}$ of the polishing powder is 0.92 μm.

Embodiment 10

(1) a lanthanum-cerium-praseodymium chloride mixed solution and an aqueous magnesium bicarbonate solution are synchronously added into a reactor at a constant speed while a little amount of phosphoric acid is added into the reactor, wherein the amount of the magnesium bicarbonate added is 116% of a theoretical amount, the mixture reacts at 25 degrees centigrade and is then stirred for 1 h to obtain a slurry.

(2) the mixture slurry prepared in step (1) is aged for 2 h while the temperature of the mixture slurry is kept at 60 degrees centigrade, then the aged slurry is filtered, washed and dried to obtain the precursor powder of the polishing powder.

(3) the precursor powder is calcinated for 4 hours at 850 degrees centigrade, then the calcinated powder is dispersed and separated to obtain a cerium oxide based composite polishing powder product containing 60.5 wt % of cerium oxide, 0.3 wt % of magnesium oxide and 0.2 wt % of phosphorus, wherein the $D_{50}$ of the polishing powder is 1.8 μm.

Embodiment 11

(1) a lanthanum-cerium-praseodymium chloride mixed solution and an aqueous magnesium bicarbonate solution are synchronously added into a reactor at a constant speed, wherein the amount of the magnesium bicarbonate added is 110% of a theoretical amount, the mixture reacts at 25 degrees centigrade and is then stirred for 1 h to obtain a slurry.

(2) a little amount of sodium phosphate is added in and uniformly mixed with the slurry prepared in step (1), the obtained mixture is aged for 3 h while the temperature of the mixture is kept at 60 degrees centigrade, and the aged mixture is filtered, washed and dried to obtain the precursor of the polishing powder.

(3) the precursor powder is calcinated for 4 hours at 950 degrees centigrade, then the calcinated powder is dispersed and separated to obtain a cerium oxide based composite polishing powder product containing 58.5 wt % of cerium oxide, 0.08 wt % of magnesium oxide and 2.6 wt % of phosphorus, wherein the $D_{50}$ of the polishing powder is 2.5 μm.

Embodiment 12

(1) a lanthanum-cerium chloride mixed solution and an aqueous magnesium bicarbonate solution are synchronously added into a reactor at a constant speed, wherein the amount of the magnesium bicarbonate added is 110% of a theoretical amount, the mixture reacts at 25 degrees centigrade and is then stirred for 1 h to obtain a slurry.

(2) a little amount of sodium fluoride is added into and uniformly mixed with the slurry prepared in step (1), the mixture is aged for 3 h while the temperature of the mixture is kept at 60 degrees centigrade, then the obtained product is filtered, washed and dried to obtain the precursor powder of the polishing powder.

(3) the precursor powder is calcinated for 4 hours at 800 degrees centigrade, then the calcinated powder is dispersed and separated to obtain a cerium oxide based composite polishing powder product containing 63.5 wt % of cerium oxide, 0.03 wt % of magnesium oxide and 3.6 wt % of fluorine, wherein the $D_{50}$ of the polishing powder is 1.5 μm.

Comparative Embodiment 2 (Prepared Using an Ordinary Technology)

(1) a lanthanum-cerium chloride mixed solution (rare earth concentration: 90 g/L to REO meter) and an aqueous ammonium bicarbonate solution are synchronously added into a reactor at a constant speed while a little amount of ammonium fluoride is added into the reactor, wherein the amount of the ammonium bicarbonate added is 110% of a theoretical amount, the mixture reacts at 25 degrees centigrade while the pH value of the mixture is 6.5, polyethylene glycol is added into the obtained product in an amount which is 2% of the theoretical weight of the polishing powder, and the obtained mixture is stirred for 3 h to obtain a slurry.

(2) the slurry prepared in step (1) is aged for 12 h while the temperature of the slurry is kept at 60 degrees centigrade, then the aged slurry is filtered, washed and dried to obtain the precursor powder of the polishing powder.

(3) the precursor powder is calcinated for 4 hours at 900 degrees centigrade, then the calcinated powder is dispersed and separated to obtain a cerium oxide based polishing powder product containing 63.5 wt % of cerium oxide, 0% of magnesium oxide and 2.2 wt % of fluorine, wherein the $D_{50}$ of the polishing powder is 3.5 μm, and $(D_{90}-D_{10})/2D_{50}=2.5$.

The obtained cerium oxide based polishing powder is prepared into a slurry, then a polishing test is conducted on the application of the slurry to a plate glass sample, the material removal rate resulting from the test is up to 0.43 mg/min and the scratch rate resulting from the test is 25%.

The material removal rate refers to the material removal amount (unit area/unit time) of a measured rare earth polishing powder sample for a glass sheet under a setted test condition; the scratch rate refers to the ratio of the number of the glass sheets having a scratch which reflects light on both the front side and the back side of a glass sheet and which is as long as or longer than the radius of the glass sheet to the total number of the glass sheets polished.

Embodiment 13

(1) a lanthanum-cerium chloride mixed solution (rare earth concentration: 90 g/L to REO meter) and an aqueous magnesium bicarbonate solution (concentration: 10 g/L to magnesium oxide meter) are synchronously added into a reactor, wherein the amount of the magnesium bicarbonate added is 110% of a theoretical amount, the mixture reacts at 25 degrees centigrade while the pH value of the mixture is 6.5, polyethylene glycol is added into the mixture in an amount which is 2% of the theoretical weight of the polishing powder, and the mixture is stirred for 3 h to obtain a slurry.

(2) the slurry prepared in step (1) is aged for 12 h while the temperature of the slurry is kept at 60 degrees centigrade, and the aged slurry is filtered, washed and dried to obtain the precursor powder of the polishing powder.

(3) the precursor powder is calcinated for 4 hours at 900 degrees centigrade, then the calcinated powder is dispersed and separated to obtain a cerium oxide based composite polishing powder product containing 65.3 wt % of cerium oxide and 0.01 wt % of magnesium oxide, wherein the $D_{50}$ of the polishing powder is 3.3 μm, and $(D_{90}-D_{10})/2D_{50}=1.78$, the polishing powder has a spherical shape.

The obtained cerium oxide based composite polishing powder is prepared into a slurry, then a polishing test is conducted on the application of the slurry to a plate glass sample, the material removal rate resulting from the test is up to 0.35 mg/min, and the scratch rate resulting from the test is 18%.

Embodiment 14

(1) a lanthanum-cerium chloride mixed solution (rare earth concentration: 90 g/L to REO meter) and an aqueous magnesium bicarbonate solution (concentration: 10 g/L to magnesium oxide meter) are synchronously added into a reactor, a little amount of ammonium fluoride is added into the reactor, wherein the amount of the magnesium bicarbonate added is 110% of a theoretical amount, the mixture reacts at 25 degrees centigrade while the pH value of the mixture is 6.5, polyethylene glycol is added into the obtained product in an amount which is 2% of the theoretical weight of the polishing powder, and the mixture is stirred for 3 h to obtain a slurry.

(2) the slurry prepared in step (1) is aged for 12 h while the temperature of the slurry is kept at 60 degrees centigrade, then the aged slurry is filtered, washed and dried to obtain the precursor powder of the polishing powder.

(3) the precursor powder is calcinated for 4 hours at 900 degrees centigrade, then the calcinated powder is dispersed and separated to obtain a cerium oxide based composite polishing powder product containing 65.3 wt % of cerium oxide, 0.01 wt % of magnesium oxide and 2.2 wt % of fluorine, wherein the $D_{50}$ of the polishing powder is 2.6 µm, and $(D_{90}-D_{10})/2D_{50}=1.66$, the polishing powder has a spherical shape.

The obtained cerium oxide based composite polishing powder is prepared into a slurry, then a polishing test is conducted on the application of the slurry to a plate glass sample, the material removal rate resulting from the test is up to 0.40 mg/min, and the scratch rate resulting from the test is 15%.

Embodiment 15

(1) cerium chloride and lanthanum chloride are prepared into a mixture solution in a certain proportion, wherein the rare earth content of the mixture solution is 120 g/L to REO meter.

(2) an aqueous magnesium bicarbonate solution the concentration of which is 15 g/L (to magnesium oxide meter) is added, as a precipitating agent, into the mixture solution prepared in step (1) at a constant speed to precipitate the mixture solution, wherein the amount of the added magnesium bicarbonate is 105% of a theoretical amount, the mixture reacts at 20 degrees centigrade while the pH value of the mixture is 5 and is then stirred for 0.5 h to obtain a mixture slurry.

(3) the mixture slurry prepared in step (2) is heated to 50 degrees centigrade, added with a little amount of sodium fluosilicate and aged for 24 h while the temperature of the reactants is kept, the obtained product is filtered, washed and dried to obtain the precursor powder of the polishing powder.

(4) the precursor powder is calcinated for 3 hours at 1000 degrees centigrade, then the calcinated powder is dispersed and separated to obtain a cerium oxide based composite polishing powder product containing 62 wt % of cerium oxide, 0.005 wt % of magnesium oxide and 5 wt % of fluorine, wherein the $D_{50}$ of the polishing powder is 4.8 µm, and $(D_{90}-D_{10})/2D_{50}=1$, the polishing powder has a spherical shape.

The obtained cerium oxide based composite polishing powder is prepared into a slurry, then a polishing test is conducted on the application of the slurry to a plate glass sample, the material removal rate resulting from the test is up to 0.47 mg/min, and the scratch rate resulting from the test is 14%.

Embodiment 16

(1) cerium chloride and lanthanum chloride are prepared into a mixture solution in a certain proportion, wherein the rare earth content of the mixture solution is 150 g/L to REO meter.

(2) an aqueous magnesium bicarbonate solution the concentration of which is 20 g/L (to magnesium oxide meter) is added, as a precipitating agent, into the mixture solution prepared in step (1) at a constant speed to precipitate the mixture solution, a little amount of ammonium phosphate is added into the reactor, wherein the amount of the added magnesium bicarbonate is 105% of a theoretical amount, the mixture reacts at 20 degrees while the pH value of the mixture is 5.5, polyethylene glycol is added into the obtained product in an amount which is 5% of the theoretical weight of the polishing powder and uniformly mixed with the resulting solution; the mixture is stirred for 3 h to obtain a slurry; the slurry is filtered, washed and dried to obtain the precursor powder of the polishing powder.

(3) the precursor powder is calcinated for 4 hours at 950 degrees centigrade, then the calcinated powder is dispersed and separated to obtain a cerium oxide based composite polishing powder product containing 62 wt % of cerium oxide, 0.05% of magnesium oxide and 5 wt % of phosphorus, wherein the $D_{50}$ of the polishing powder is 2.5 µm, and $(D_{90}-D_{10})/2D_{50}=1.2$, the polishing powder has a spherical shape.

The obtained cerium oxide based polishing powder is prepared into a slurry, then a polishing test is conducted on the application of the slurry to a plate glass sample, and the material removal rate resulting from the test is up to 0.41 mg/min and the scratch rate resulting from the test is 13%.

Embodiment 17

(1) an aqueous magnesium bicarbonate solution (concentration: 20 g/L to magnesium oxide meter) and tacerium-anthanum chloride mixed solution (concentration: 100 g/L to REO meter) are continuously added in a reaction kettle while a little amount of sodium phosphate is added into the reaction kettle, wherein the amount of the added magnesium bicarbonate is 115% of a theoretical amount, the mixture reacts at 25 degrees centigrade while the pH value of the mixture is 7, the obtained product is stirred for 4 h, then polyethylene glycol is added into the obtained solution in an amount which is 0.1% of the theoretical weight of the polishing powder and uniformly mixed with the obtained solution, the obtained product is fed into an aging tank and aged in the aging tank for 2 h at 70 degrees centigrade, the obtained product is filtered, washed and dried to obtain the precursor powder of the polishing powder.

(2) the precursor powder is calcinated for 8 hours at 700 degrees centigrade, then the calcinated powder is dispersed and separated to obtain a cerium oxide based composite polishing powder product containing 60 wt % of cerium oxide, 0.5 wt % of magnesium oxide and 0.1 wt % of phosphorus, wherein the $D_{50}$ of the polishing powder is 1.2 µm, and $(D_{90}-D_{10})/2D_{50}=0.89$, the polishing powder has a spherical shape.

The obtained cerium oxide based composite polishing powder is prepared into a slurry, then a polishing test is conducted on the application of the slurry to a plate glass sample, the material removal rate resulting from the test is up to 0.36 mg/min, and the scratch rate resulting from the test is 11%.

Embodiment 18

(1) an aqueous magnesium bicarbonate solution (concentration: 15 g/L to magnesium oxide meter) and a cerium chloride (concentration: 100 g/L to REO meter) solution are continuously added in a reaction kettle at a constant speed, a little amount of phosphoric acid is also added into the reaction kettle, wherein the amount of the added magnesium bicarbonate is 100% of a theoretical amount, the mixture reacts at 30 degrees centigrade while the pH value of the mixture is 5, polyethylene glycol is added into the mixture in an amount which is 3.2% of the theoretical weight of the polishing powder and uniformly mixed with the mixture, then the mixture is fed into an aging tank and aged in the aging tank for 5 h at 60 degrees centigrade, the aged mixture is filtered, washed and dried to obtain the precursor powder of the polishing powder.

(2) the precursor powder is calcinated for 6 hours at 850 degrees centigrade, then the calcinated powder is dispersed and separated to obtain a cerium oxide based composite polishing powder product containing 99.99 wt % of cerium oxide, 0.005 wt % of magnesium oxide and 0.001 wt % of phosphorus, wherein the $D_{50}$ of the polishing powder is 3.4 μm, and $(D_{90}-D_{10})/2D_{50}=1.4$, the polishing powder has a spherical shape.

The obtained cerium oxide based polishing powder is prepared into a slurry, then a polishing test is conducted on the application of the slurry to a plate glass sample, and the material removal rate resulting from the test is up to 0.45 mg/min and the scratch rate resulting from the test is 14%.

Embodiment 19

(1) a lanthanum-cerium-praseodymium-neodymium chloride mixed solution (rare earth concentration: 200 g/L, to REO meter) and an aqueous magnesium bicarbonate solution (concentration: 25 g/L to magnesium oxide meter) are synchronously added into a reactor, a little amount of hydrogen fluoride is added into the reactor, wherein the amount of the magnesium bicarbonate added is 130% of a theoretical amount, the mixture reacts at 15 degrees centigrade while the pH value of the mixture is 8, polyethylene glycol is added into the obtained product in an amount which is 1% of the theoretical weight of the polishing powder and uniformly mixed with the obtained product, and the mixture is stirred for 2 h to obtain a slurry.

(2) the slurry prepared in step (1) is aged for 48 h while the temperature of the slurry is kept at 30 degrees centigrade, then the aged slurry is filtered and dried to obtain the precursor powder of the polishing powder.

(3) the precursor powder is calcinated for 6 hours at 950 degrees centigrade, then the calcinated powder is dispersed and separated to obtain a cerium oxide based composite polishing powder product containing 40.5 wt % of cerium oxide, 4.8 wt % of magnesium oxide and 0.2 wt % of fluorine, wherein the $D_{50}$ of the polishing powder is 3.8 μm, and $(D_{90}-D_{10})/2D_{50}=1.5$, the polishing powder has a spherical shape.

The obtained cerium oxide based composite polishing powder is prepared into a slurry, then a polishing test is conducted on the application of the slurry to a plate glass sample, the material removal rate resulting from the test is up to 0.44 mg/min, and the scratch rate resulting from the test is 15%.

Embodiment 20

(1) a cerium chloride solution (rare earth concentration: 20 g/L to REO meter) and an aqueous magnesium bicarbonate solution (concentration: 10 g/L to magnesium oxide meter) are synchronously added into a reactor, sodium fluoride is added into the reactor, wherein the amount of the magnesium bicarbonate added is 117% of a theoretical amount, the mixture reacts at 28 degrees centigrade while the pH value of the mixture is 6.8, ethylene glycol is added into the mixture in an amount which is 0.1% of the theoretical weight of the polishing powder and uniformly mixed with the mixture, and the uniformly mixed mixture is stirred for 2 h to obtain a slurry.

(2) the slurry is aged for 5 h while the temperature of the slurry is kept at 60 degrees centigrade, then the aged slurry is filtered and dried to obtain the precursor powder of the polishing powder.

(3) the precursor powder is calcinated for 5 hours at 800 degrees centigrade, then the calcinated powder is dispersed and separated to obtain a cerium oxide based composite polishing powder product containing 96.7 wt % of cerium oxide, 1 wt % of praseodymium oxide, 1 wt % of magnesium oxide and 8 wt % of fluorine, wherein the $D_{50}$ of the polishing powder is 3.3 μm, and $(D_{90}-D_{10})/2D_{50}=0.91$, the polishing powder has a spherical shape.

The obtained cerium oxide based polishing powder is prepared into a slurry, then a polishing test is conducted on the application of the slurry to a plate glass sample, and the material removal rate resulting from the test is up to 0.43 mg/min and the scratch rate resulting from the test is 13%.

Embodiment 21

(1) magnesium bicarbonate (concentration: 10 g/L to magnesium oxide meter) is prepared as a precipitating agent, wherein the amount of the magnesium bicarbonate used in 110% of a theoretical amount, a cerium sulfate solution (rare earth concentration: 5 g/L to REO meter) is added into the precipitating agent to react with the precipitating agent to generate a slurry, then a little amount of dibasic sodium phosphate and a little amount of sodium fluoride are added into the slurry, the mixture reacts at 25 degrees centigrade while the pH value of the mixture is 6.4, sequentially, ethylene glycol is added into the mixture in an amount which is 5% of the theoretical weight of the polishing powder and uniformly mixed with the mixture, and the uniformly mixed mixture is stirred for 1 h to obtain a slurry.

(2) the slurry prepared in step (1) is aged for 2 h while the temperature of the slurry is kept at 90 degrees centigrade, then the aged slurry is filtered, washed and dried to obtain the precursor powder of the polishing powder.

(3) the precursor powder is calcinated for 2 hours at 600 degrees centigrade, then the calcinated powder is dispersed and separated to obtain a cerium oxide based composite polishing powder product containing 94.8 wt % of cerium oxide, 1.15 wt % of magnesium oxide, 0.8 wt % of fluorine and 0.5 wt % of phosphorus, wherein the $D_{50}$ of the polishing powder is 0.5 μm, and $(D_{90}-D_{10})/2D_{50}=0.85$, the polishing powder has a spherical shape.

The obtained cerium oxide based composite polishing powder is prepared into a slurry, then a polishing test is conducted on the application of the slurry to a plate glass sample, the material removal rate resulting from the test is up to 0.31 mg/min, and the scratch rate resulting from the test is 7%.

Embodiment 22

(1) cerium chloride and lanthanum chloride are prepared into a mixture solution in a certain proportion (rare earth concentration: 300 g/L to REO meter).

(2) an aqueous magnesium bicarbonate solution (25 g/L to magnesium oxide meter) reacts, as a precipitating agent, with the mixture solution prepared in step (1) at a temperature of 30 degrees centigrade to react with the precipitating agent in a coprecipitation manner while the pH value of the mixture is 7.5 to obtain a slurry, wherein the amount of the aqueous magnesium bicarbonate solution used is 120% of a theoretical amount, and then a surfactant ethylene glycol is added into the slurry in an amount of 3.1% of the theoretical weight of the polishing powder, and the mixture is stirred for 0.5 h to obtain a mixture slurry.

(3) the mixture slurry prepared in step (2) is aged for 5 h while the temperature of the mixture slurry is kept at 80 degrees centigrade, then a little amount of ammonium hydrogen phosphate is added into and uniformly mixed with the aged slurry, and the uniformly mixed mixture is filtered and dried to obtain the precursor powder of the polishing powder.

(4) the precursor powder is calcinated for 4 hours at 750 degrees centigrade, then the calcinated powder is dispersed and separated to obtain a cerium oxide based composite polishing powder product containing 70 wt % of cerium oxide, 1.9 wt % of magnesium oxide and 2.8 wt % of phosphorus, wherein the $D_{50}$ of the polishing powder is 0.02 μm, and $(D_{90}-D_{10})/2D_{50}=1.27$, the polishing powder has a spherical shape.

The obtained cerium oxide based polishing powder is prepared into a slurry, then a polishing test is conducted on the application of the slurry to a plate glass sample, and the material removal rate resulting from the test is up to 0.20 mg/min and the scratch rate resulting from the test is 9%.

Embodiment 23

(1) cerium nitrate and lanthanum nitrate are prepared into a mixture solution (rare earth concentration: 90 g/L to REO meter) in a certain proportion.

(2) first, an aqueous magnesium bicarbonate solution (concentration: 10 g/L to magnesium oxide meter) is added into basal water of an aqueous ammonium fluoride solution in an amount which is 100% of a theoretical amount needed by the aqueous magnesium bicarbonate solution to react with ammonium fluoride, then the mixture solution prepared in step (1) and an aqueous magnesium bicarbonate solution are synchronously added into the basal water in the form of parallel flows, wherein the amount of the aqueous magnesium bicarbonate solution added is 110% of a theoretical amount needed by the aqueous magnesium bicarbonate solution to react with ammonium fluoride and the lanthanum and cerium mixed solution, the mixture reacts at 25 degrees centigrade while the pH value of the mixture is 6.5, polyethylene glycol is added into the obtained product in an amount which is 2% of the theoretical weight of the polishing powder, and the mixture is stirred for 3 h to obtain a slurry.

(3) the slurry prepared in step (2) is aged for 12 h while the temperature of the slurry is kept at 60 degrees centigrade, then the aged slurry is filtered and washed to obtain the precursor powder of the polishing powder.

(4) the precursor powder is calcinated for 4 hours at 900 degrees centigrade, then the calcinated powder is dispersed and separated to obtain a cerium oxide based composite polishing powder product containing 63 wt % of cerium oxide, 0.01 wt % of magnesium oxide and 2.3 wt % of fluorine, wherein the $D_{50}$ of the polishing powder is 2.3 μm, and $(D_{90}-D_{10})/2D_{50}=0.63$, the polishing powder has a spherical shape.

The obtained cerium oxide based composite polishing powder is prepared into a slurry, then a polishing test is conducted on the application of the slurry to a plate glass sample, the material removal rate resulting from the test is up to 0.42 mg/min, and the scratch rate resulting from the test is 6%.

Embodiment 24

(1) cerium chloride and lanthanum chloride are prepared into a mixture solution (rare earth concentration: 120 g/L, to REO meter) in a certain proportion.

(2) first, an aqueous magnesium bicarbonate solution (concentration: 15 g/L, to magnesium oxide meter) is added into basal water of an aqueous sodium fluosilicate solution in an amount which is 100% of a theoretical amount needed by the aqueous magnesium bicarbonate solution to react with sodium fluosilicate, then the mixture solution prepared in step (1) and an aqueous magnesium bicarbonate solution are synchronously added into the basal water in the form of parallel flows, wherein the amount of the aqueous magnesium bicarbonate solution added is 105% of a theoretical amount needed, the mixture reacts at 20 degrees centigrade while the pH value of the mixture is 5 and is then stirred for 0.5 h to obtain a slurry.

(3) the slurry prepared in step (2) is aged for 24 h while the temperature of the slurry is kept at 50 degrees centigrade, then the aged slurry is filtered and washed to obtain the precursor powder of the polishing powder.

(4) the precursor powder is calcinated for 3 hours at 1000 degrees centigrade, then the calcinated powder is dispersed and separated to obtain a cerium oxide based composite polishing powder product containing 60 wt % of cerium oxide, 0.005 wt % of magnesium oxide and 5 wt % of fluorine, wherein the $D_{50}$ of the polishing powder is 3.5 μm, and $(D_{90}-D_{10})/2D_{50}=0.92$, the polishing powder has a spherical shape.

The obtained cerium oxide based composite polishing powder is prepared into a slurry, then a polishing test is conducted on the application of the slurry to a plate glass sample, the material removal rate resulting from the test is up to 0.46 mg/min, and the scratch rate resulting from the test is 9%.

Embodiment 25

(1) cerium chloride and lanthanum chloride are prepared into a mixture solution (rare earth concentration: 150 g/L to REO meter) in a certain proportion.

(2) first, an aqueous magnesium bicarbonate solution (concentration: 20 g/L to magnesium oxide meter) is added into basal water of an aqueous ammonium phosphate solution in an amount which is 100% of a theoretical amount needed for the aqueous magnesium bicarbonate solution to react with ammonium phosphate, then the mixture solution prepared in step (1) and an aqueous magnesium bicarbonate solution are synchronously added into the basal water in the form of parallel flows, wherein the amount of the aqueous magnesium bicarbonate solution added is 105% of a theoretical amount needed, the mixture reacts at 20 degrees centigrade while the pH value of the mixture is 5.5, sequentially, polyethylene glycol is added into the mixture in an amount which is 5% of the theoretical weight of the polishing powder, the resulting mixture is stirred for 3 h to obtain a slurry, and the slurry is filtered, washed and dried to obtain the precursor powder of the polishing powder.

(3) the precursor powder is calcinated for 4 hours at 950 degrees centigrade, then the calcinated powder is dispersed and separated to obtain a cerium oxide based composite polishing powder product containing 62 wt % of cerium oxide, 0.05 wt % of magnesium oxide and 5 wt % of phosphorus, wherein the $D_{50}$ of the polishing powder is 2 μm, and $(D_{90}-D_{10})/2D_{50}=0.77$, the polishing powder has a spherical shape.

The obtained cerium oxide based composite polishing powder is prepared into a slurry, then a polishing test is conducted on the application of the slurry to a plate glass sample, the material removal rate resulting from the test is up to 0.42 mg/min, and the scratch rate resulting from the test is 7%.

Embodiment 26

(1) cerium chloride and lanthanum chloride are prepared into a mixture solution (rare earth concentration: 100 g/L to REO meter) in a certain proportion.

(2) first, an aqueous magnesium bicarbonate solution (concentration: 20 g/L to magnesium oxide meter) is added into basal water of an aqueous sodium phosphate solution in an amount of 80% of a theoretical amount needed for the aqueous magnesium bicarbonate solution to react with sodium phosphate, then the mixture solution prepared in step (1) and an aqueous magnesium bicarbonate solution are synchronously added into the basal water in the form of parallel flows, wherein the amount of the aqueous magnesium bicarbonate solution added is 115% of the theoretical amount needed for the reaction, the mixture reacts at 25 degrees centigrade while the pH value of the mixture is 7, sequentially, polyethylene glycol is added into the mixture in an amount which is 0.1% of the theoretical weight of the polishing powder, the resulting mixture is stirred for 4 h to obtain a slurry.

(3) the slurry prepared in step (2) is aged for 2 h while the temperature of the slurry is kept at 70 degrees centigrade, then the aged slurry is filtered and washed to obtain the precursor powder of the polishing powder.

(4) the precursor powder is calcinated for 8 hours at 700 degrees centigrade, then the calcinated powder is dispersed and separated to obtain a cerium oxide based composite polishing powder product containing 60 wt % of cerium oxide, 0.5 wt % of magnesium oxide and 0.1 wt % of phosphorus, wherein the $D_{50}$ of the polishing powder is 1.8 μm, and $(D_{90}-D_{10})/2D_{50}=0.65$, the polishing powder has a spherical shape.

The obtained cerium oxide based composite polishing powder is prepared into a slurry, then a polishing test is conducted on the application of the slurry to a plate glass sample, the material removal rate resulting from the test is up to 0.38 mg/min, and the scratch rate resulting from the test is 6%.

Embodiment 27

(1) a cerium chloride solution is prepared, wherein the rare earth concentration of the prepared cerium chloride solution is 100 g/L to REO meter.

(2) first, an aqueous magnesium bicarbonate solution (concentration: 15 g/L to magnesium oxide meter) is added into basal water of a phosphoric acid solution in an amount which is 100% of a theoretical amount needed for the aqueous magnesium bicarbonate solution to react with phosphoric acid, then the mixture solution prepared in step (1) and an aqueous magnesium bicarbonate solution are synchronously added into the basal water in the form of parallel flows, wherein the amount of the aqueous magnesium bicarbonate solution added is 100% of a theoretical amount needed, the mixture reacts at 30 degrees centigrade while the pH value of the mixture is 5, sequentially, polyethylene glycol is added into the mixture in an amount which is 3.2% of the theoretical weight of the polishing powder, the resulting mixture is stirred for 5 h to obtain a slurry.

(3) the slurry prepared in step (2) is aged for 5 h while the temperature of the slurry is kept at 60 degrees centigrade, then the aged slurry is filtered and washed to obtain the precursor powder of the polishing powder.

(4) the precursor powder is calcinated for 6 hours at 850 degrees centigrade, then the calcinated powder is dispersed and separated to obtain a cerium oxide based composite polishing powder product containing 99.99 wt % of cerium oxide, 0.005 wt % of magnesium oxide and 0.003 wt % of phosphorus, wherein the $D_{50}$ of the polishing powder is 2.3 μm, and $(D_{90}-D_{10})/2D_{50}=0.8$, the polishing powder has a spherical shape.

The obtained cerium oxide based composite polishing powder is prepared into a slurry, then a polishing test is conducted on the application of the slurry to a plate glass sample, the material removal rate resulting from the test is up to 0.42 mg/min, and the scratch rate resulting from the test is 7%.

Embodiment 28

(1) a lanthanum cerium praseodymium neodymium chloride solution the rare earth concentration of which is 200 g/L to REO meter is prepared.

(2) first, an aqueous magnesium bicarbonate solution (concentration: 25 g/L to magnesium oxide meter) is added into basal water of a hydrogen fluoride solution in an amount which is 50% of a theoretical amount needed for the aqueous magnesium bicarbonate solution to react with hydrogen fluoride, then the mixture solution prepared in step (1) and an aqueous magnesium bicarbonate solution are synchronously added into the basal water in the form of parallel flows, wherein the amount of the aqueous magnesium bicarbonate solution added is 130% of a theoretical amount needed, the mixture reacts at 15 degrees centigrade while the pH value of the mixture is 8, sequentially, polyethylene glycol is added into the mixture in an amount which is 1% of the theoretical weight of the polishing powder, the resulting mixture is stirred for 2 h to obtain a slurry.

(3) the slurry prepared in step (2) is aged for 48 h while the temperature of the slurry is kept at 30 degrees centigrade, then the aged slurry is filtered and washed to obtain the precursor powder of the polishing powder.

(4) the precursor powder is calcinated for 6 hours at 950 degrees centigrade, then the calcinated powder is dispersed and separated to obtain a cerium oxide based composite polishing powder product containing 40 wt % of cerium oxide, 5 wt % of magnesium oxide and 0.2 wt % of fluorine, wherein the $D_{50}$ of the polishing powder is 5 μm, and $(D_{90}-D_{10})/2D_{50}=1$, the polishing powder has a spherical shape.

The obtained cerium oxide based composite polishing powder is prepared into a slurry, then a polishing test is conducted on the application of the slurry to a plate glass sample, the material removal rate resulting from the test is up to 0.48 mg/min, and the scratch rate resulting from the test is 10%.

Embodiment 29

(1) a cerium chloride solution is prepared, wherein the rare earth concentration of the prepared cerium chloride solution is 20 g/L to REO meter.

(2) first, an aqueous magnesium bicarbonate solution (concentration: 10 g/L to magnesium oxide meter) is added into basal water of an sodium fluoride solution in an amount which is 70% of a theoretical amount needed for the aqueous magnesium bicarbonate solution to react with sodium fluoride, then the mixture solution prepared in step (1) and an aqueous magnesium bicarbonate solution are synchronously added into the basal water in the form of parallel flows, wherein the amount of the aqueous magnesium bicarbonate solution added is 117% of a theoretical amount needed, the mixture reacts at 28 degrees centigrade while the pH value of the mixture is 6.8, sequentially, ethylene glycol is added into the mixture in an amount which is 0.1% of the theoretical weight of the polishing powder, the resulting mixture is stirred for 2 h to obtain a slurry.

(3) the slurry prepared in step (2) is aged for 5 h while the temperature of the slurry is kept at 60 degrees centigrade, then the aged slurry is filtered and washed to obtain the precursor powder of the polishing powder.

(4) the precursor powder is calcinated for 5 hours at 800 degrees centigrade, then the calcinated powder is dispersed and separated to obtain a cerium oxide based composite polishing powder product containing 97.5 wt % of cerium oxide, 1 wt % of magnesium oxide and 8 wt % of fluorine, wherein the $D_{50}$ of the polishing powder is 3 µm, and $(D_{90}-D_{10})/2D_{50}=0.81$, the polishing powder has a spherical shape.

The obtained cerium oxide based composite polishing powder is prepared into a slurry, then a polishing test is conducted on the application of the slurry to a plate glass sample, the material removal rate resulting from the test is up to 0.44 mg/min, and the scratch rate resulting from the test is 7%.

Embodiment 30

(1) a cerium sulfate solution the rare earth concentration of which is 10 g/L to REO meter is prepared.

(2) first, an aqueous magnesium bicarbonate solution (concentration: 5 g/L to magnesium oxide meter) is added into basal water of a dibasic sodium phosphate and sodium fluoride mixed solution in an amount which is 100% of a theoretical amount needed for the aqueous magnesium bicarbonate solution to react with dibasic sodium phosphate and sodium fluoride, then the mixture solution prepared in step (1) and an aqueous magnesium bicarbonate solution are synchronously added into the basal water in the form of parallel flows, wherein the amount of the aqueous magnesium bicarbonate solution added is 110% of a theoretical amount needed for the reaction, the mixture reacts at 25 degrees centigrade while the pH value of the mixture is 6.4, sequentially, ethylene glycol is added into the mixture in an amount which is 3.1% of the theoretical weight of the polishing powder, and the resulting mixture is stirred for 1 h to obtain a slurry.

(3) the slurry prepared in step (2) is aged for 2 h while the temperature of the slurry is kept at 90 degrees centigrade, then the aged slurry is filtered and washed to obtain the precursor powder of the polishing powder.

(4) the precursor powder is calcinated for 2 hours at 600 degrees centigrade, then the calcinated powder is dispersed and separated to obtain a cerium oxide based composite polishing powder product containing 95 wt % of cerium oxide, 1.15 wt % of magnesium oxide, 0.7 wt % of fluorine and 0.5 wt % of phosphorus, wherein the $D_{50}$ of the polishing powder is 0.75 µm, and $(D_{90}-D_{10})/2D_{50}=0.57$, the polishing powder has a spherical shape.

The obtained cerium oxide based polishing powder is prepared into a slurry, a polishing test is conducted on the application of the slurry to a plate glass sample, and the material removal rate resulting from the test is up to 0.32 mg/min and the scratch rate resulting from the test is 31%.

Embodiment 31

(1) cerium nitrate and lanthanum nitrate are prepared into a mixture solution in a certain proportion (300 g/L to REO meter).

(2) first, an aqueous magnesium bicarbonate solution (concentration: 25 g/L to magnesium oxide meter) is added into basal water of an ammonium hydrogen phosphate solution in an amount which is 100% of a theoretical amount needed for the aqueous magnesium bicarbonate solution to react with ammonium hydrogen phosphate, then the mixture solution prepared in step (1) and an aqueous magnesium bicarbonate solution are synchronously added into the basal water in the form of parallel flows, wherein the amount of the aqueous magnesium bicarbonate solution added is 110% of a theoretical amount needed, the mixture reacts at 30 degrees centigrade while the pH value of the mixture is 7.5, sequentially, ethylene glycol is added into the mixture in an amount which is 5% of the theoretical weight of the polishing powder, and the resulting mixture is stirred for 0.5 h to obtain a slurry.

(3) the slurry prepared in step (2) is aged for 5 h while the temperature of the slurry is kept at 80 degrees centigrade, then the aged slurry is filtered and washed to obtain the precursor powder of the polishing powder.

(4) the precursor powder is calcinated for 4 hours at 750 degrees centigrade, then the calcinated powder is dispersed and separated to obtain a cerium oxide based composite polishing powder product containing 70 wt % of cerium oxide, 2 wt % of magnesium oxide and 3 wt % of phosphorus, wherein the $D_{50}$ of the polishing powder is 0.04 µm, and $(D_{90}-D_{10})/2D_{50}=0.73$, the polishing powder has a spherical shape.

The obtained cerium oxide based composite polishing powder is prepared into a slurry, then a polishing test is conducted on the application of the slurry to a plate glass sample, the material removal rate resulting from the test is up to 0.26 mg/min, and the scratch rate resulting from the test is 5%.

Embodiment 32

(1) cerium nitrate is prepared into a mixture solution in a certain proportion (rare earth concentration: 60 g/L to REO meter).

(2) first, an aqueous magnesium bicarbonate solution (concentration: 13 g/L to magnesium oxide meter) is added into basal water of an sodium fluoride solution in an amount which is 60% of a theoretical amount needed for the aqueous magnesium bicarbonate solution to react with sodium fluoride, then the mixture solution prepared in step (1) and an aqueous magnesium bicarbonate solution are synchronously added into the basal water in the form of parallel flows, wherein the amount of the aqueous magnesium bicarbonate solution added is 115% of a theoretical amount needed, the mixture reacts at 25 degrees centigrade while the pH value of the mixture is 7, sequentially, ethylene glycol is added into the mixture in an amount which is 2.5% of the theoretical weight of the polishing powder, the resulting mixture is stirred for 3 h to obtain a slurry.

(3) the slurry prepared in step (2) is aged for 8 h while the temperature of the slurry is kept at 65 degrees centigrade, then the aged slurry is filtered and washed to obtain the precursor powder of the polishing powder.

(4) the precursor powder is calcinated for 3 hours at 900 degrees centigrade, then the calcinated powder is dispersed and separated to obtain a cerium oxide based composite polishing powder product containing 99 wt % of cerium oxide, 0.1 wt % of magnesium oxide and 0.5 wt % of phosphorus, wherein the $D_{50}$ of the polishing powder is 0.05 μm, and $(D_{90}-D_{10})/2D_{50}=0.8$, the polishing powder has a spherical shape.

The obtained cerium oxide based composite polishing powder is prepared into a slurry, then a polishing test is conducted on the application of the slurry to a plate glass sample, the material removal rate resulting from the test is up to 0.25 mg/min, and the scratch rate resulting from the test is 2%.

The mentioned above is merely preferred embodiments of the disclosure but is not to be construed as limitation to the protection scope of the disclosure, and a variety of variations and modifications can be devised by those skilled in the art. Any modification, substitute and improvement made without departing from the spirit and scope of the present invention should all fall within the protection scope of the present invention.

The invention claimed is:

1. A cerium oxide based composite polishing powder, wherein the cerium oxide based composite polishing powder comprises the element magnesium in an amount of 0.005-5 wt % to magnesium oxide meter, the cerium oxide based composite polishing powder further comprises 0.2-8 wt % of the element of fluorine or further comprises 0.1-5 wt % of the element of phosphorus.

2. The cerium oxide based composite polishing powder according to claim 1, wherein the content of the element of magnesium is 0.01-2 wt % to magnesium oxide meter.

3. The cerium oxide based composite polishing powder according to claim 1, wherein further comprises: at least one of the other rare earth elements different from cerium.

4. The cerium oxide based composite polishing powder according to claim 1, wherein the content of cerium oxide is 40-99.99 wt %.

5. The cerium oxide based composite polishing powder according to claim 1, wherein the median particle diameter $D_{50}$ of the cerium oxide based composite polishing powder is 0.02-5 μm.

6. The cerium oxide based composite polishing powder according to claim 1, wherein the median particle diameter $D_{50}$ of the cerium oxide based composite polishing powder is 0.5-3 μm.

* * * * *